United States Patent
Castaneda et al.

(10) Patent No.: US 10,058,802 B2
(45) Date of Patent: Aug. 28, 2018

(54) FILTER HOUSING WITH REMOVABLE MULTI-CARTRIDGE HOLDER

(71) Applicant: Heateflex Corporation, Arcadia, CA (US)

(72) Inventors: Hector J. Castaneda, Cypress, CA (US); Donald R. Girdner, Jr., Montclair, CA (US)

(73) Assignee: Heateflex Corporation, Arcadia, CA (US)

( * ) Notice: Subject to any disclaimer, the term of this patent is extended or adjusted under 35 U.S.C. 154(b) by 803 days.

(21) Appl. No.: 14/467,931

(22) Filed: Aug. 25, 2014

(65) Prior Publication Data

US 2016/0051912 A1    Feb. 25, 2016

(51) Int. Cl.
*B01D 29/52* (2006.01)

(52) U.S. Cl.
CPC ...... *B01D 29/52* (2013.01); *B01D 2201/0453* (2013.01); *B01D 2201/313* (2013.01); *B01D 2201/347* (2013.01)

(58) Field of Classification Search
CPC .................................................... B01D 29/52
See application file for complete search history.

(56) References Cited

U.S. PATENT DOCUMENTS

| | | | | |
|---|---|---|---|---|
| 4,322,293 A * | 3/1982 | Morgan, Jr. | ........... | B01D 29/27 210/232 |
| 5,154,742 A * | 10/1992 | Gault | ...................... | B01D 45/08 55/315.2 |
| 5,591,335 A * | 1/1997 | Barboza | ................ | B01D 29/111 210/323.2 |
| 6,007,718 A * | 12/1999 | Booth | .................... | B01D 29/15 210/232 |
| 6,315,815 B1 * | 11/2001 | Spadaccini | ........ | B01D 19/0031 95/46 |
| 2003/0075493 A1 * | 4/2003 | Schuyler | ................ | B01D 29/21 210/237 |

* cited by examiner

*Primary Examiner* — Peter Keyworth
(74) *Attorney, Agent, or Firm* — Kelly & Kelley, LLP (57) ABSTRACT

The present invention is directed to a filter housing with a removable filter assembly having an elongated shell assembly, a removable head assembly, and a removable filter assembly. The shell assembly has an inlet section, an outlet section, and a filter assembly opening. The removable filter cartridge includes a top tube sheet, a bottom tube sheet and a plurality of filter cartridges. The filter cartridges provide the only fluid passage through the bottom tube sheet, which otherwise sealing engages a ring assembly within the shell assembly proximate to the outlet section.

22 Claims, 11 Drawing Sheets

FILTER HOUSING WITH REMOVABLE MULTI-CARTRIDGE HOLDER

BACKGROUND OF THE INVENTION

The present invention is relates to a filter housing with a removable, multi-cartridge holder. More particularly, the present invention is directed to filter cartridge holders adapted to hold, seal, and align an array of filter cartridges mounted in an associated filter housing.

Systems used in desalination, particularly pre-filtration to reverse osmosis equipment, have particular filtration requirements and experience certain difficulties not found in other filtration systems. Because the fluid going through pre-filtration is seawater, proper wetted surface materials must be selected to insure reliable, on-going operation. Such systems have particular requirements as they relate to the preparation of drinking water. Additional challenges include creating a reliable seal or isolation, between the non-filtered input fluid and the output fluid- or filtered section of the housing.

In addition, the filter must also enable large fluid flows with minimal pressure drop. Because uptime is critical, the filter must be easily removable to allow replacement or exchange of the filter cartridges.

Accordingly, there is a need for a replaceable filter cartridge for filtration systems that is acceptable for use with desalination systems and that provides adequate sealing or isolation between inlets and outlets. The present invention fulfills these needs and provides other related advantages.

SUMMARY OF THE INVENTION

The present invention is directed to a filter housing with a removable filter assembly. The filter housing has an elongated shell assembly with an inlet section, an outlet section, and a filter assembly opening. A removable head assembly is configured for sealing engagement with the filter assembly opening on the elongated shell assembly. A removable filter assembly is configured for insertion into and removal from the elongated shell assembly through the filter assembly opening. The filter assembly comprises a plurality of filter cartridges oriented generally between the inlet section and the outlet section. A seal assembly on the filter assembly is configured for sealing engagement with a ring assembly on an interior perimeter of the shell assembly. The ring assembly is disposed between the inlet section and the outlet section—proximate to the outlet section. The plurality of filter cartridges occupies a plurality of through holes in the seal assembly such that the only fluid passage through the seal assembly is through the filter cartridges.

The head assembly preferably has a push down assembly disposed around an interior perimeter. The push down assembly applies pressure to the filter assembly, which helps create the sealing engagement between the seal assembly and the ring assembly. The push down assembly preferably comprises an annular ring or a plurality of push down lugs disposed around the interior perimeter of the head assembly. The filter assembly preferably comprises a top tube sheet configured to receive the push down assembly when the head assembly sealingly engages the filter assembly opening.

The seal assembly preferably comprises a bottom tube sheet and a sealing gasket around a perimeter thereof. The bottom tube sheet seats against the ring assembly with the sealing gasket therebetween. The sealing gasket comprises a U-shaped gasket around an exterior of the bottom tube sheet, or an O-ring gasket within a groove on the bottom tube sheet.

The filter assembly further comprises two or more baffle sheets oriented generally parallel to the bottom tube sheet and configured such that the plurality of filter cartridges pass through each of the two or more baffle sheets. The baffle sheets may also be considered as being perpendicular to the filter cartridges. The baffle sheets define baffle levels oriented generally transverse to the long axis of the shell assembly. Each of the two or more baffle sheets comprise a cut-out wherein the cut-outs on any two adjacent baffle sheets are staggered or alternated around the interior perimeter of the shell assembly.

An impingement surface is disposed in the inlet section with fluid openings disposed around edges of the impingement surface. The fluid openings lead into the baffle levels. The filter cartridges preferably comprise melt blown polypropylene with a 20 micron rating.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

In the following detailed description, the filtration system of the present invention is generally referred to by reference numeral 10 in FIGS. 1-10. The individual components and the overall structural relationship of the components of the filtration system 10 are most clearly shown in FIG. 6.

The filtration system 10 generally comprises a filter housing 12 having an inlet 14 and an outlet 16. Preferably, the filter housing 12 is generally oriented vertically with the inlet 14 above the outlet 16. The filter housing 12 may be oriented other than vertically, i.e., horizontally, canted at an angle, or with the outlet 16 above the inlet 14. However, the filtration system 10 operates most efficiently when the housing 12 is oriented vertically as preferred.

The filter housing 12 preferably has a generally elongated ellipsoid shape, but may be configured in other shapes as required. A head assembly 18 and a shell assembly 20 combine to form the housing 12. The head assembly 18 generally comprises one curved end of the ellipsoid with a flange 22 extending around the perimeter of the head assembly 18. A mating flange 24 exists on the shell assembly 20 for abutting against the flange 22 of the head assembly 18. The flange 22 and mating flange 24 are joined together by a plurality of securing bolts 26 or similar securing structure. The joining of the flanges 22, 24 must be secure enough to withstand the pressures of fluid flow in a desalination or similar facility. The filter housing 12, including the head assembly 18 and the shell assembly 20, are preferably manufactured from carbon steel then internally lined as discussed elsewhere.

The inlet 14 and outlet 16 pass through a side wall of the shell assembly 20. A plurality of legs 28 may be included to raise the housing 12 off of the floor or other supporting surface. A vent 30 for pressure relief or similar operations is preferably included in the top of the head assembly 18. A drain pipe 32 is preferably included in the bottom of the shell assembly 20 to permit complete drainage of the housing 12. The head assembly 18 may also include securing brackets 34 for attaching chains or similar structures to aid in removal of the head assembly 18 as by a motor.

Figure 1:
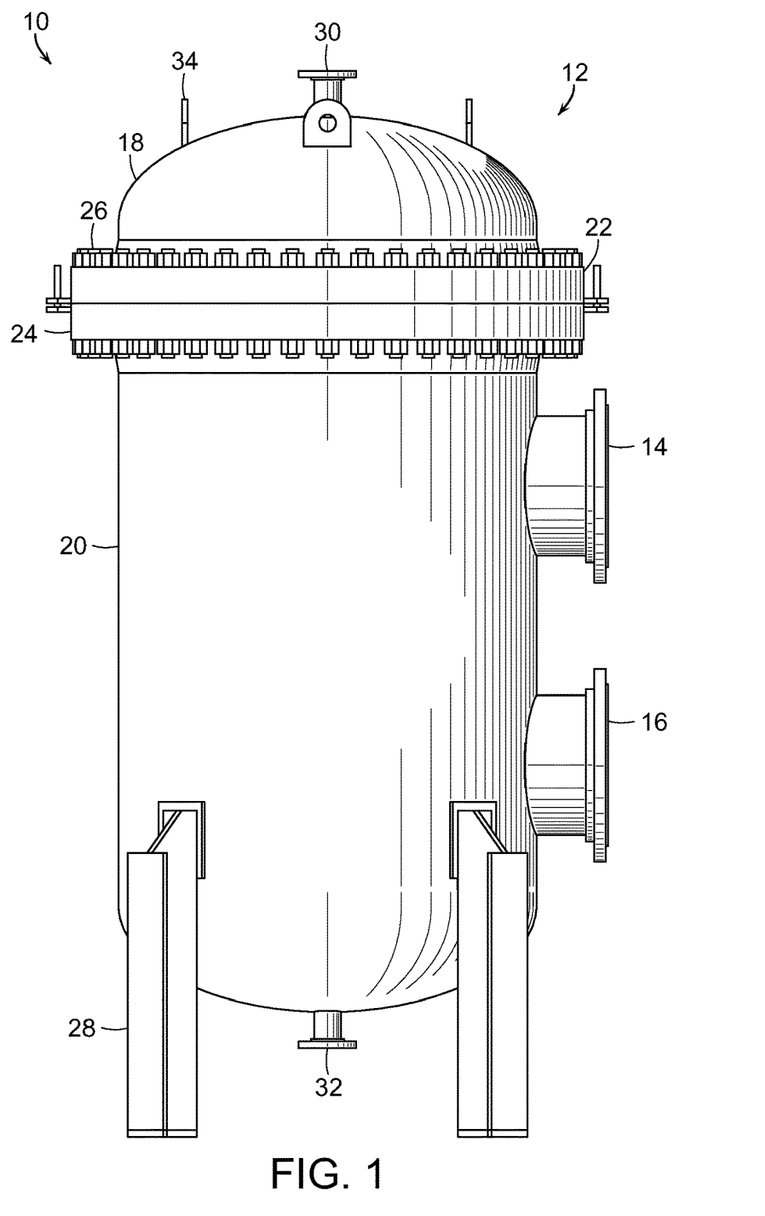
FIG. 1 is an isometric side view of the filter housing of the present invention.
Figure 2:
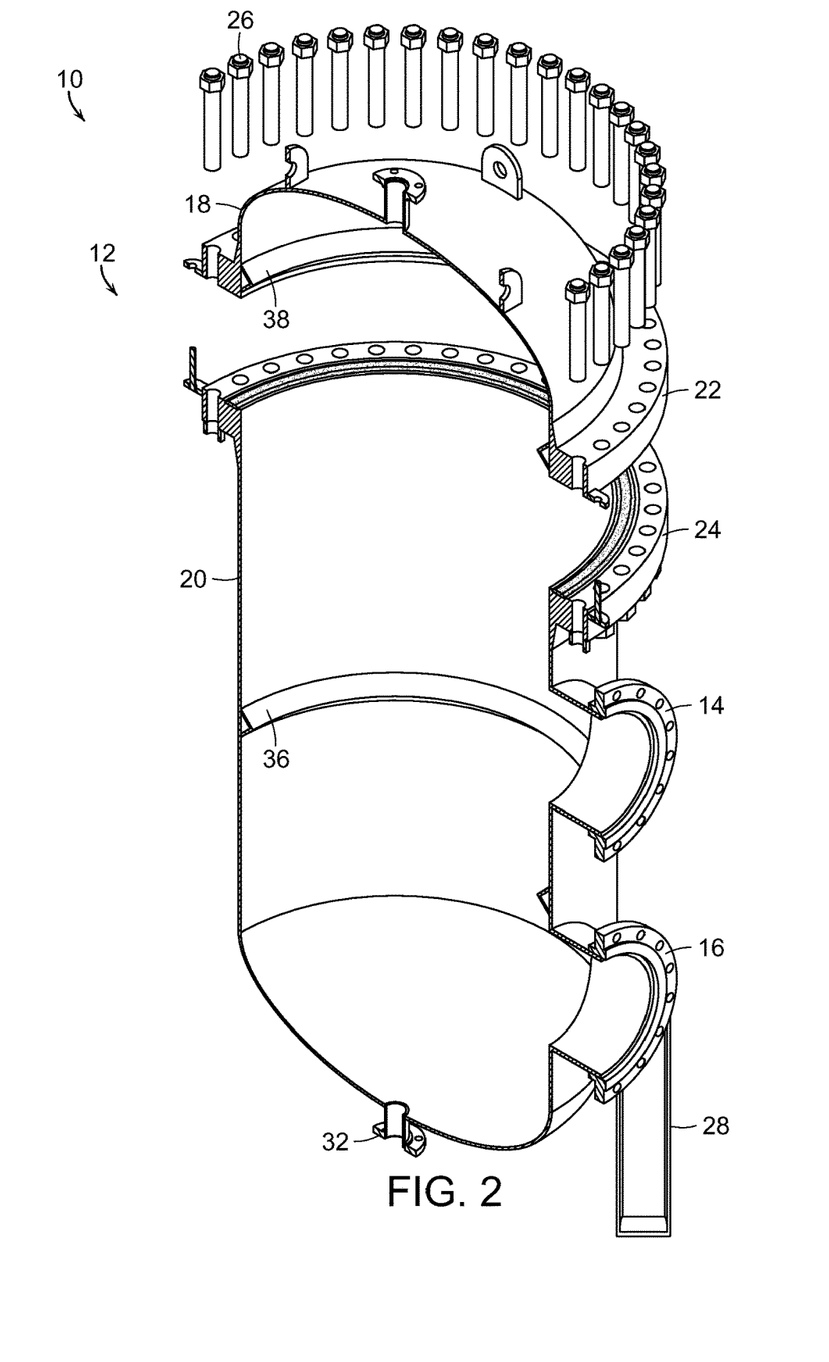
FIG. 2 is a cross-sectional, partially exploded, perspective view of the filter housing of the present invention.
Figure 3:
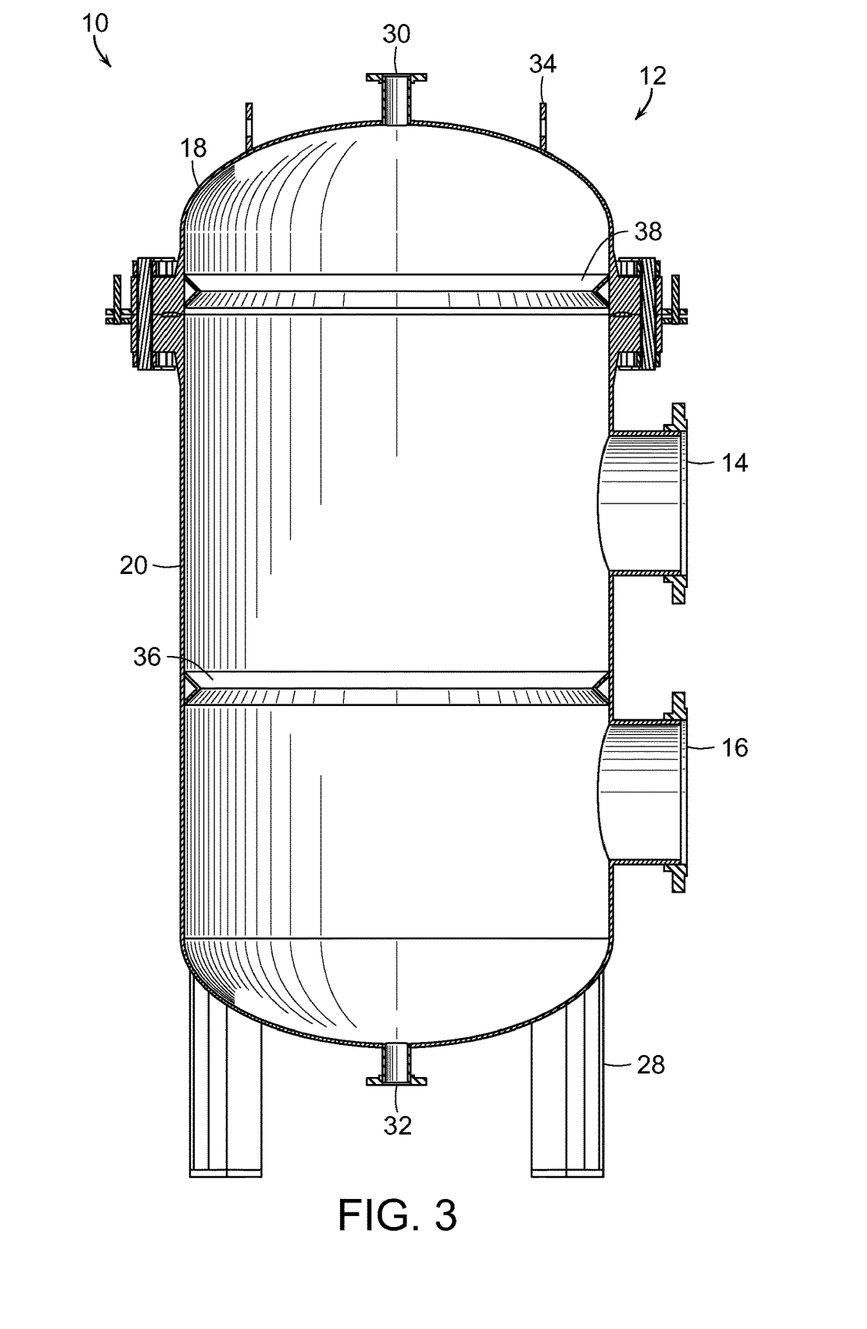
FIG. 3 is a cut-away view of the filter housing of FIG. 1.
Figure 4:
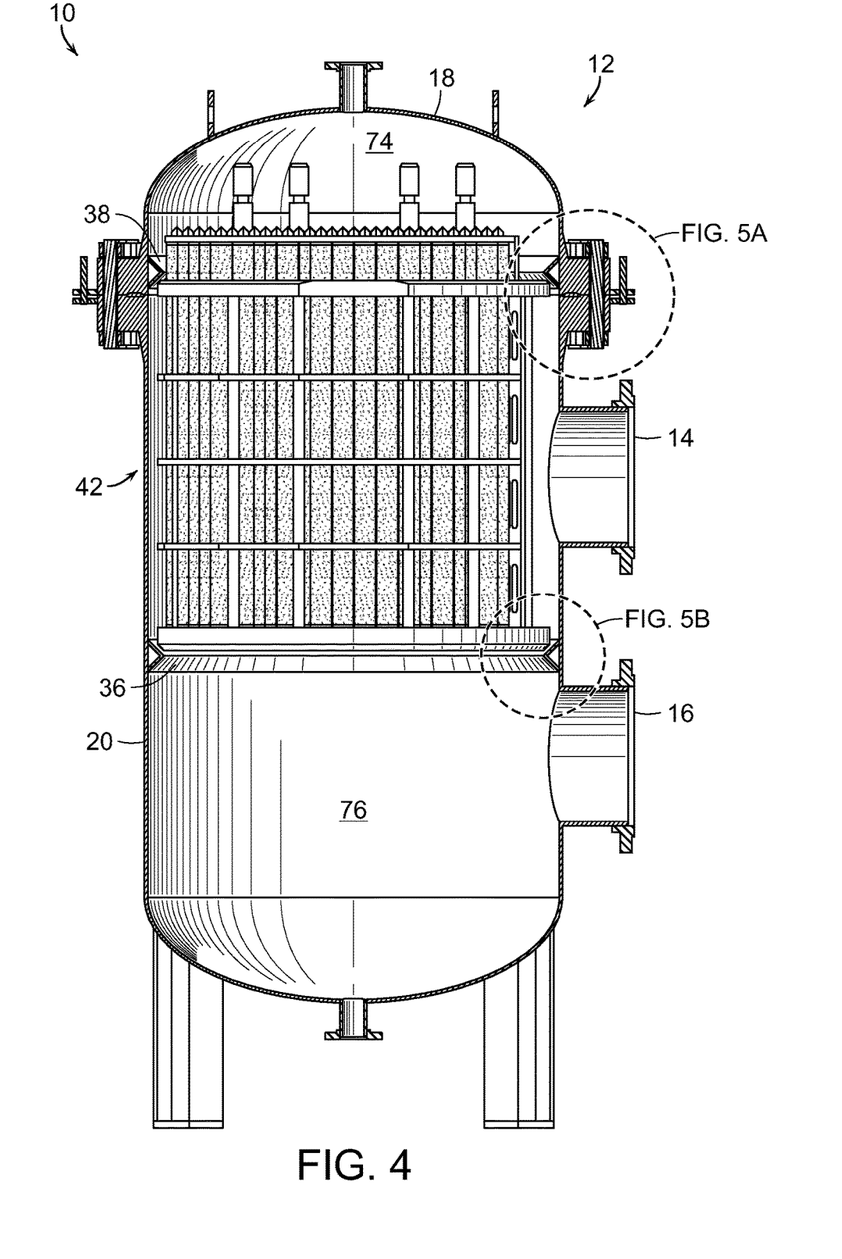
FIG. 4 is a cross-sectional view of the filter housing including filtration cartridge of the present invention.
Figure 5A:
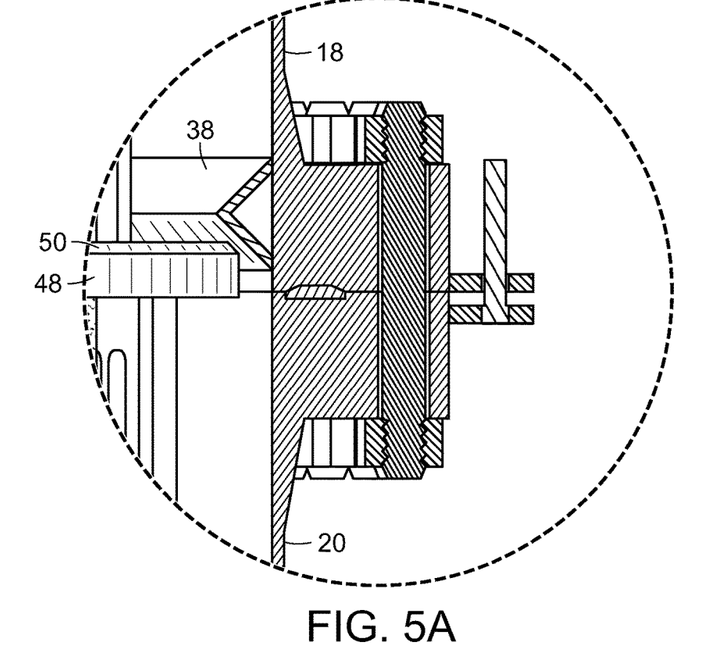
FIG. 5A is a close-up view of the head assembly seal and lock mechanism.
Figure 5B:
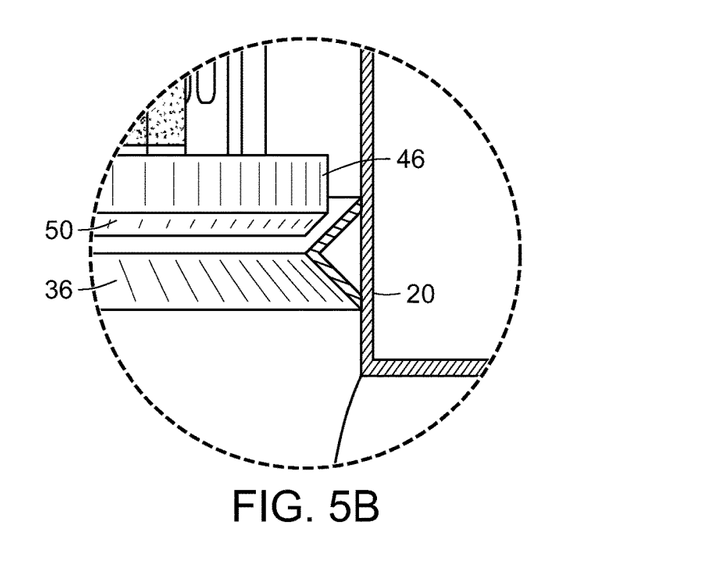
FIG. 5B is a close-up view of the ring assembly seal.
Figure 6:
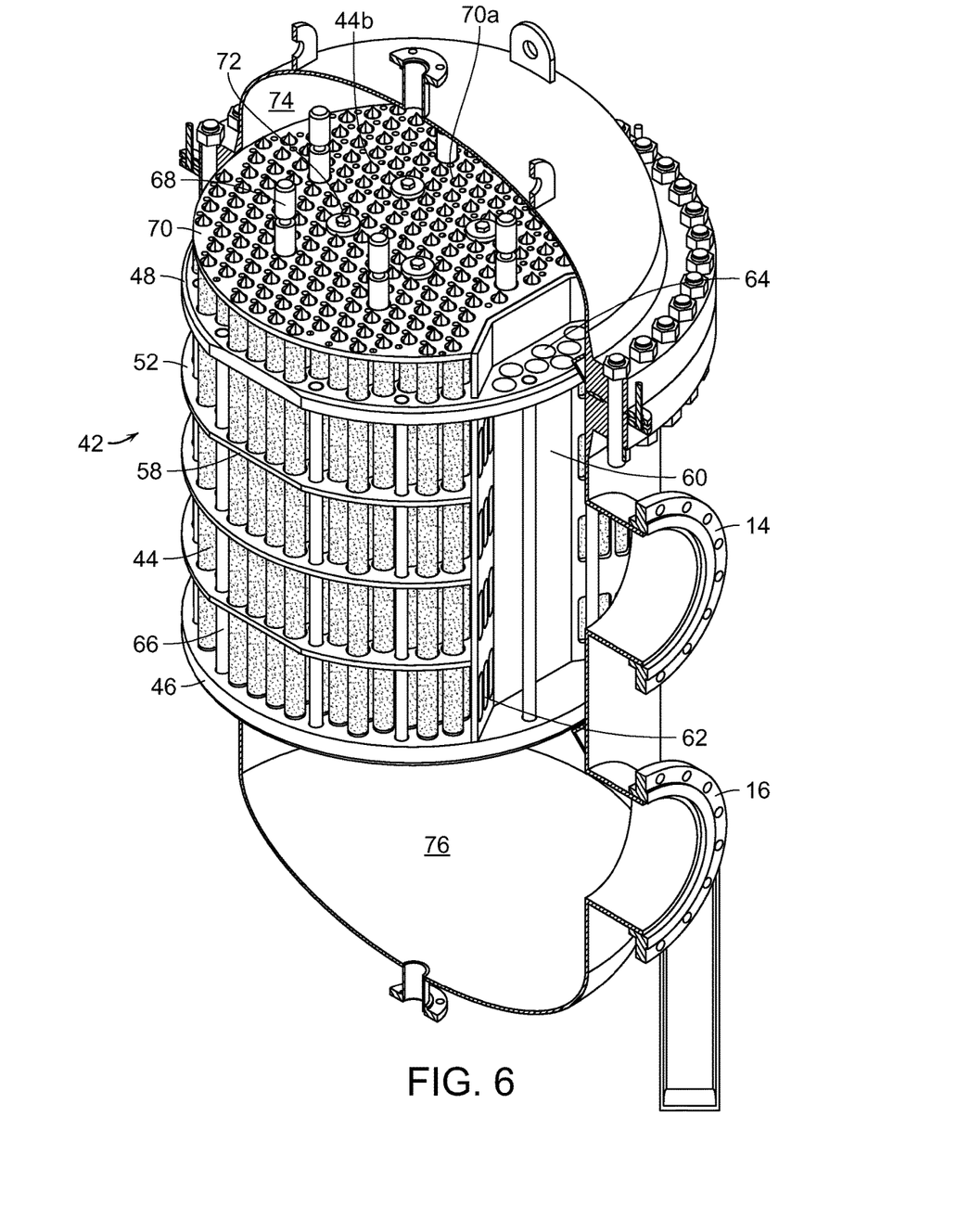
FIG. 6 is a cut-away perspective view of the filter housing and filter cartridge.
Figure 7:
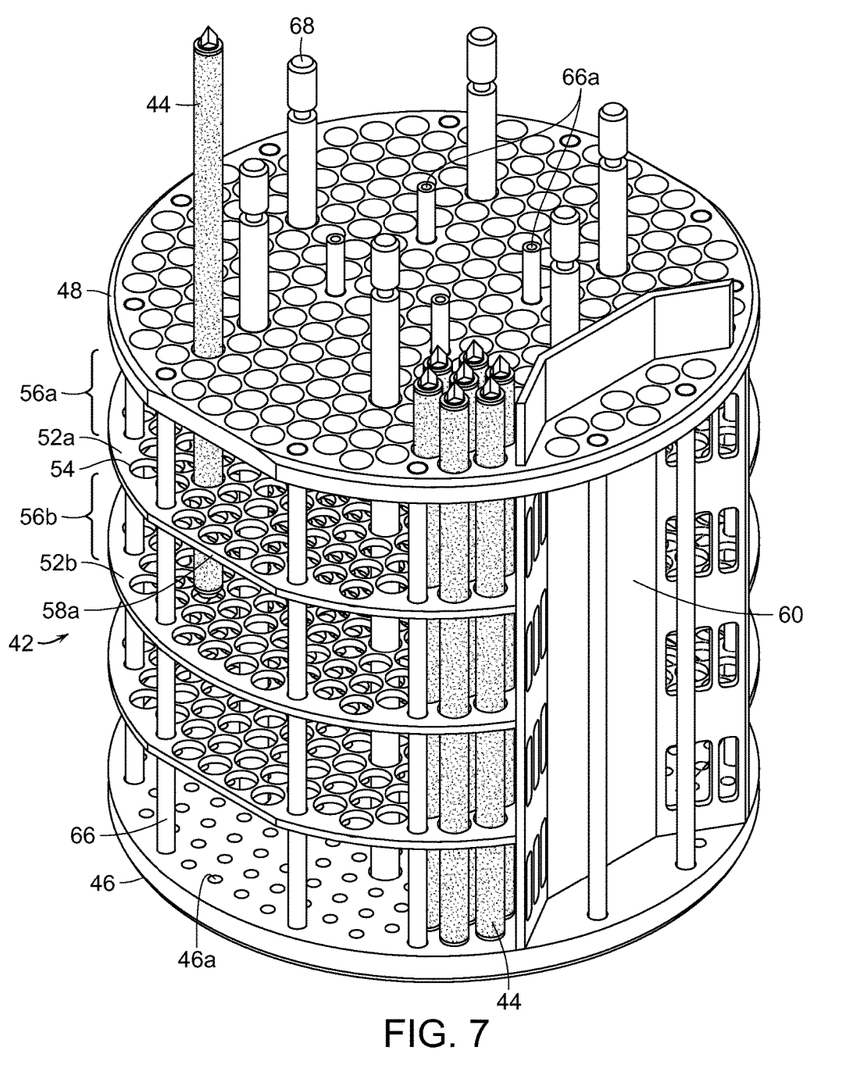
FIG. 7 is a cut-away perspective view of the filter housing and filter cartridges with the head assembly removed.
Figure 8:
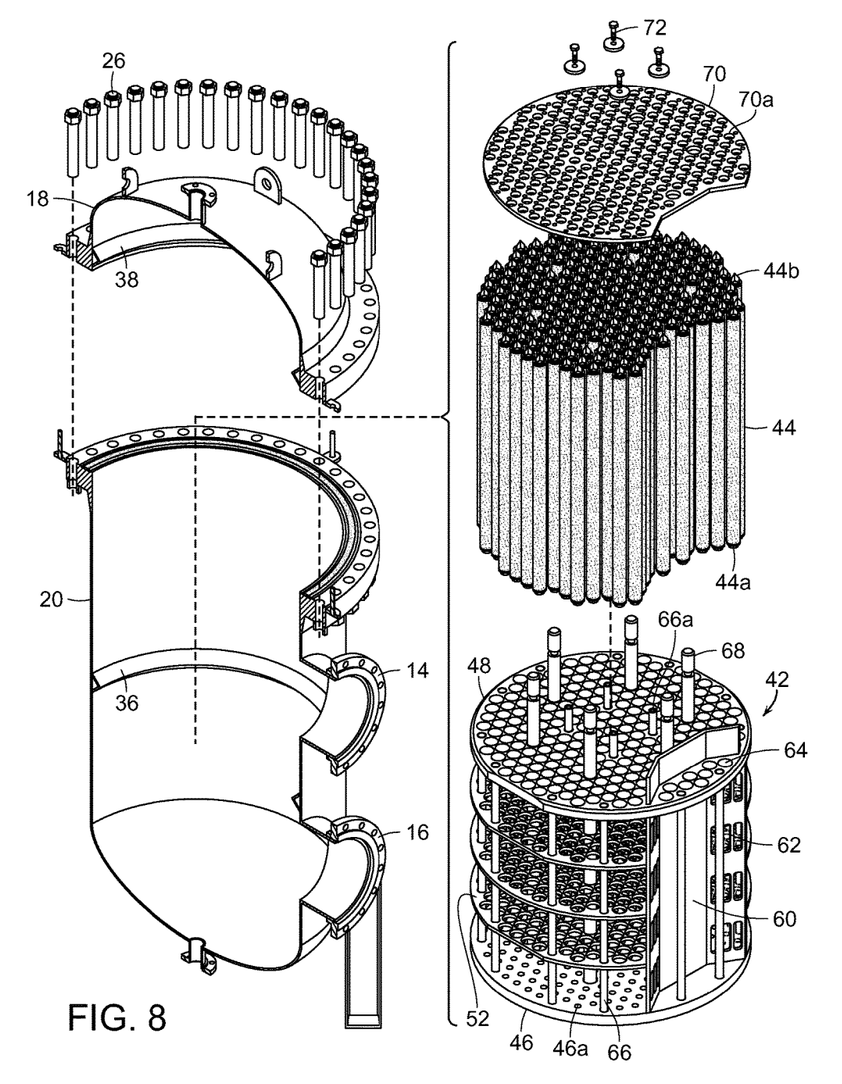
FIG. 8 is an exploded perspective view of the filter housing and filter cartridges.

As shown in FIG. 5B, a lower ring assembly 36 is positioned inside of the shell assembly 20 between the inlet 14 and the outlet 16. The lower ring assembly 36 is preferably positioned immediately above the outlet 16 to maximize the useable space occupied by the filter holder described below. The lower ring assembly 36 preferably provides a complete and uninterrupted annular ledge or lip around the interior surface of the shell assembly 20. FIG. 5A illustrates a push down assembly 38 positioned immediately inside of the head assembly 18. The push down assembly 38 preferably provides a complete and uninterrupted annular ledge or lip around the interior surface of the head assembly 18. The interior of both the head assembly 18 and the shell assembly 20 preferably includes a protective liner 40. The protective liner 40 is designed to protect the housing 12 against corrosion, erosion, or other similar damage. Such liner 40 is preferably made from a rubber material such as chlorobutyl rubber, sold under the trade name ENDURAFLEX by Blair Rubber Company. Other similar rubber materials may also be used.

The filtration system 10 also includes a filter assembly or basket 42 that is configured to retain a plurality of filter cartridges 44 in the housing 12. The filter assembly 42 may be inserted into and removed from the shell assembly 20 when the head assembly 18 is removed. As depicted in FIGS. 4, 6, 7, and 8, the filter assembly 42 includes a bottom tube sheet 46 and a top tube sheet 48, between which the filter cartridges 44 pass. The plurality of filter cartridges 44 allows for large fluid flows with insignificant pressure drop. Because uptime is critical in large fluid flow operations, the entire filter assembly 42 is configured to be removable to allow a user to replace then entire filter assembly 42 with a replacement assembly 42a, if necessary. Alternative, individual filter cartridges 44 may be removed and replaced in the filter assembly 42, if necessary.

As shown in FIG. 5B, the bottom tube sheet 46 is configured to rest against the ring assembly 36 in a sealed manner such that no fluids pass between the bottom tube sheet 46 and the ring assembly 36. This must create a reliable seal between or isolation of the non-filtered fluid and the output fluid or filtered section of shell assembly 20. The bottom tube sheet 46 preferably has a beveled edge 50 that matches the face of the ring assembly 36 so as to maximize the contact surface area. It may also include a gasket around its edge to provide additional sealing. As shown in FIG. 5A, the top tube sheet 48 preferably has a similar construction to provide a similar seal against fluid flow.

The push down assembly 38 exerts pressure on the top tube sheet 48 when the head assembly 18 is secured in place. A plastic pad 39 may be included between the push down assembly 38 and the top tube sheet 48 to provide the seal against fluid flow discussed above. This force is transferred through the filter assembly 42 to the bottom tube sheet 46, which compresses the gasket or similar structure around the bottom tube sheet 46 against the ring assembly 36. This force also creates the seal between the filter assembly 42 and the ring assembly 36.

The plurality of filter cartridges 44 span the distance between the top tube sheet 48 and the bottom tube sheet 46. Spaced between the top tube sheet 48 and the bottom tube sheet 46 are multiple baffles 52. The baffles 52 have through holes 54 to accommodate the cartridges 44 as they pass through from top to bottom. The baffles 52 help guide the filter cartridges 44 through the filter assembly 42 into the bottom tube sheet 46 during insertion and removal. The baffles 52 are configured to span the width of the shell assembly 20 so as to generally obstruct the direct flow of fluid between two adjacent baffle levels 56 around the edge of each baffle 52. The obstruction provided between the side wall of the shell assembly 20 and the baffle 52 is not water-tight, but do provide a path of resistance such that the fluid will seek out another path of least resistance to flow between baffle levels 56.

Each baffle 52 has one or more cut-outs 58 around its perimeter to provide that path of least resistance. The cut-outs 58 may generally comprise a perimeter sliver of the baffle 52 such that an adjacent exterior row of filter cartridges 44 still passes through the baffle 52. Alternatively, the cut-outs 58 may comprise a row slice of the baffle 52 such that the adjacent exterior row of filter cartridges 44 by-passes the baffle 52 through the cut-out 58. In alternating baffle levels 56, the positions of the cut-outs 58 are staggered such that the cut-out 58a from baffle 52a is not immediately above or below the cut-out 58b from baffle 52b, and so on through each baffle 52. In this way, fluid flow from baffle level 56a to baffle level 56b flows in a serpentine or side-to-side pattern as it flows through each baffle level 56.

Between the top 48 and bottom 46 tube sheets, the filter assembly 42 of this embodiment (FIG. 6) includes an impingement face 60 facing the inlet 12 of the system 10 and spanning from top to bottom of the filter assembly 42. The impingement face 60 redirects the fluid flow to the sides and up/down the filter assembly 42. Fluid slots 62 on either side of the impingement face 60 allow the fluid flow to pass into the baffle levels 56 between the baffles 52 and aligned with the fluid slots 62. The top tube sheet 48 may include a plurality of fluid holes 64 to permit passage of inlet fluid redirected by the impingement face 60 upward. The bottom tube sheet 46 does not contain any holes as it is sealed against the passage of inlet fluid redirected by the impingement face 60.

The top and bottom tube sheets, 48, 46 and the baffles 52 are supported and held in place by a plurality of support rods 66 that fix the relative positions of these elements with respect to rotation and vertical spacing. The filter assembly 42 also includes a plurality of lifting rods 68 that provide similar support and fixation for the components. The lifting rods 68 also protrude above the top tube sheet 48 to provide an anchor point for attaching a chain or similar mechanism for lifting and removing the filter assembly 42 from the shell assembly 20. The lifting rods 68 may also protrude below the bottom tube sheet 46.

The filter cartridges 44 are configured to be individually removed from the filter assembly 42 by simply lifting them through the top tube sheet 48. The bottom tube sheet 46 has a plurality of holes 46a designed to receive the bottom end of each filter cartridge 44. The diameters of these holes 46a in the bottom tube sheet 46 are slightly smaller than the diameters of the filter cartridges 44 such that the filter cartridges do not pass through the holes 46a. The bottom end of each filter cartridge 44 has a narrow tip 44a designed to sit-in and be retained by the holes 46a.

Once the filter cartridges 44 are in place, a hold down plate 70 is positioned on top of the filter assembly 42 to secure the cartridges 44 in place. The hold down plate 70 has a plurality of holes 70a similar to the holes 46a of the bottom tube sheet 46, i.e., of a smaller diameter than the filter cartridges 44. The top ends of each filter cartridge 44 also have a narrow tip 44b which sits-in and is retained by the holes 70a. The holes 70a also allow for refreshing the fluid in the area above 74 the top tube sheet 48 and helping to equalize the flow of fluid between the filter cartridges 44. The hold down plate 70 is secured in place by bolts 72 or similar means attached to inner support rods 66a.

The various components of the filter assembly 42, including the bottom tube sheet 46, the top tube sheet 48, the baffles 52, the impingement plate 60, the support rods 66, the lifting rods 68, and the hold down plate 70 are preferably made from a plastic material such as polypropylene or similar. The propylene for all of these components is preferably natural polypropylene. The filter cartridges 44 are preferably cylindrical filters made from melt blown polypropylene or similar filter media and have a rating of 20 microns.

In operation, fluid to be filtered, i.e., seawater or a similarly contaminated source, is pumped into the inlet 14. As the fluid impacts the impingement face 60, its flow is redirected toward the fluid holes 64 in the top tube sheet 48 and the fluid slots 62 at each baffle level 56. The fluid flows into the area above 74 the top tube sheet 48 and into each baffle level 56 between the baffles 52. Within each baffle level 56, the fluid is forced to flow from one side to the other, i.e., an extreme edge, prior to flowing down to the next baffle level 56 as the cut-outs 58 are positioned on opposite sides of the each baffle 52. In this way, the fluid flow fills all areas of each baffle level 56 minimizing areas of stagnation.

With the baffle levels 56 full of fluid and the area above 74 the top tube sheet 48 containing water, the filter cartridges 44 are surrounded on all sides by the fluid to be filtered. As the fluid comes into contact with the filter cartridges 44, the fluid passes through the filter media, i.e., melt blown polypropylene, into the center where it exits through the bottom tip 44a. The contaminants, particulates and impurities, i.e., salt as in seawater, are entrapped by the filter media and removed from the fluid. As the filtered fluid exits the bottom tip 44a of the filter cartridge 44, it passes through the hole 46a in the bottom of the tube sheet 46. The filtered fluid in the area below 76 the bottom tube sheet 46 is purified and has fewer contaminants than the original unfiltered fluid. From the area below 76 the bottom tube sheet 46, the filtered fluid exits the outlet 16 and is conveyed by pipes or other means for further processing or utility. Any particulates or impurities that may have made it through the filter cartridges 44 may settle out in the area below 76 the bottom tube sheet 46 to the drain pipe 32 in the very bottom of the shell assembly 20.

Figure 9A:
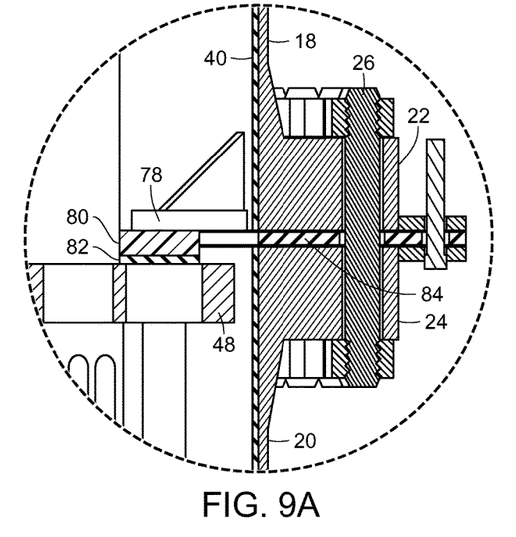
FIG. 9A is a close-up view of an alternate embodiment of the head assembly seal and lock mechanism.
Figure 9B:
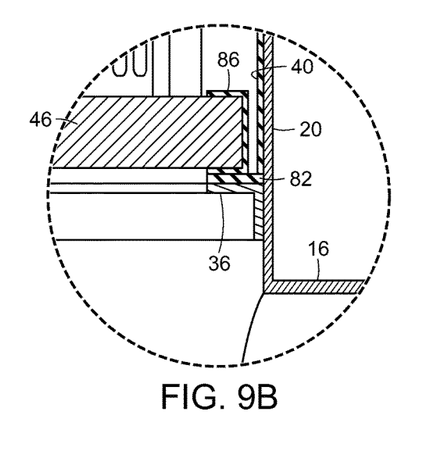
FIG. 9B is a close-up view of an alternate embodiment of the ring assembly seal.
Figure 10:
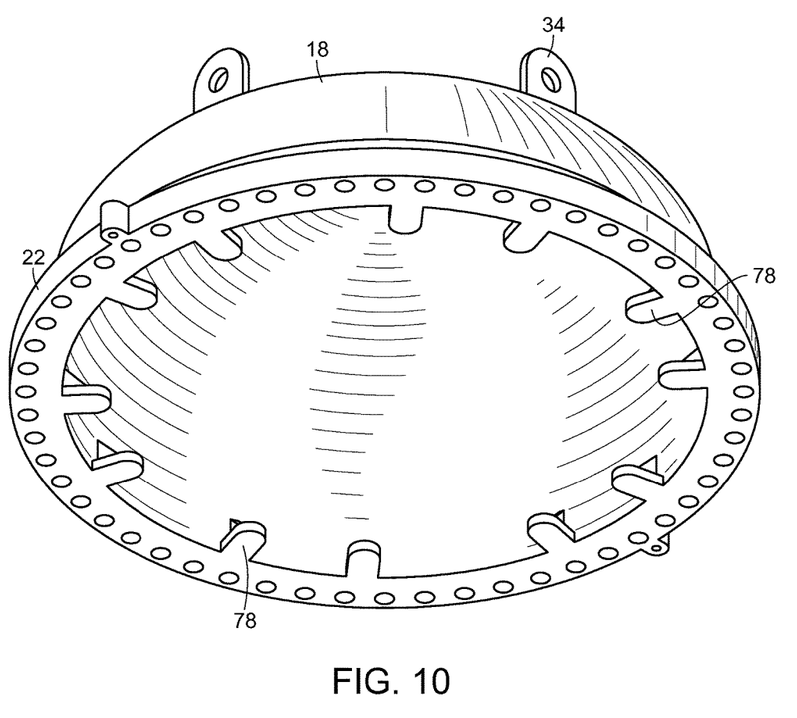
FIG. 10 is a lower perspective view of an alternate embodiment of the head assembly.

FIGS. 9A and 9B illustrate an alternate embodiment of the seals at the push down assembly 38 and ring assembly 36. As shown in FIG. 10, the push down assembly 38 around the interior of the head assembly 18 is replaced by a plurality of push down lugs 78 spaced around the interior circumference. The push down lugs 78 rest against a plastic pad 80 and a rubber pad 82, which both ultimately rest on the top tube sheet 48. The force resulting from the push down lugs holds the filter assembly 42 in place against the ring assembly 36 as described elsewhere. The system 10 may also include a flange gasket 84 between the flanges 22, 24 of the head assembly 18 and shell assembly 20. This flange gasket 84 provides additional sealing against fluid leaks.

Figure 9C:
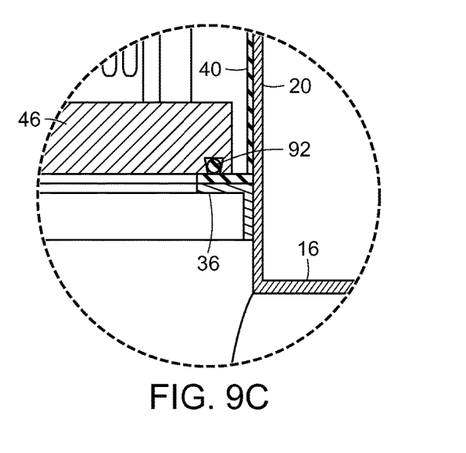
FIG. 9C is a close-up view of another alternate embodiment of the ring assembly seal.

FIG. 9B illustrates an alternate embodiment of the ring assembly 36 and bottom tube sheet 46. In this embodiment, the ring assembly 36 provides a substantially horizontal annular ring surface to receive the bottom tube sheet 46, which itself present a substantially horizontal underside. A U-shaped gasket 86 surrounds the perimeter of the bottom tube sheet 46 to provide additional sealant against leaks. The force exerted by the push down assembly 38 or lugs 78 squeezes this gasket 86 and presses the bottom tube sheet 46 firmly against the ring assembly 36. FIG. 9C illustrates a similar embodiment of the ring assembly 36 and bottom tube sheet 46, including an O-ring gasket in the bottom tube sheet 46 for added sealing.

Figure 11:
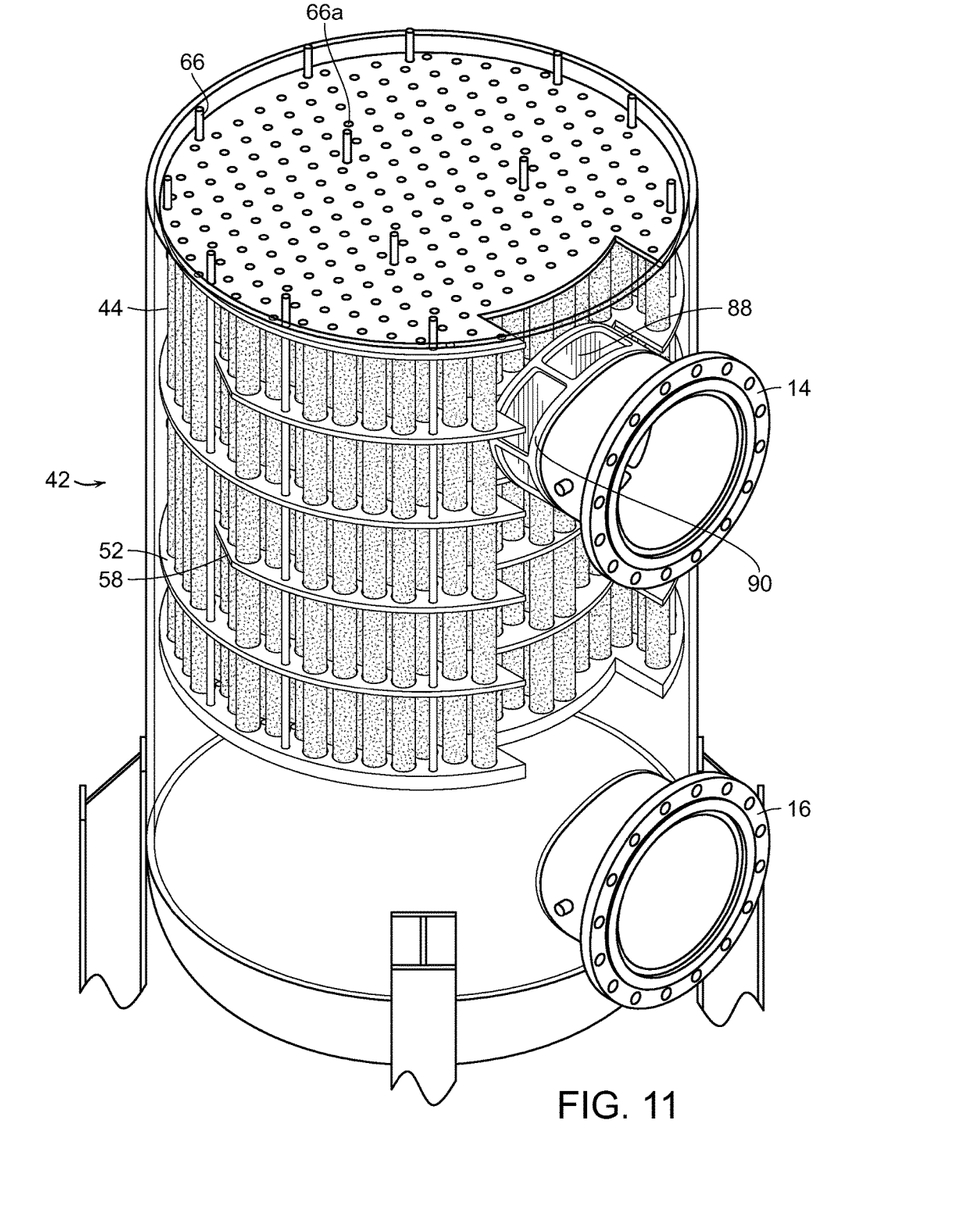
FIG. 11 is a transparent perspective view of an alternate embodiment of the filter housing and filter cartridge.

FIG. 11 illustrates an alternate embodiment of the inlet 14 and impingement face 60. In this embodiment, the impingement face 60 is replaced by an impingement plate 88 that eclipses the inlet 14 and provides perimeter ports 90. Similar to the earlier embodiment, the impingement plate 88 and perimeter ports 90 redirect the fluid flow to the sides and up/down the shell assembly 20. This configuration of the impingement plate 88 provides for more even distribution of the fluid through the system 10 and prevents stagnation. In this drawing figure, the ring assembly 36 has been removed for reasons of clarity. The ring assembly 36 and resultant seal with the bottom tube sheet 46 is critical to the operation of the system 10. With the configuration of the impingement plate 88, it is necessary for the bottom tube sheet 46 to have a cut-out so that the filter assembly 42 can slide in and out of the shell assembly 20. The ring assembly 36 must have a sufficient width to create a seal around this cut-out in the bottom tube sheet 46.

Although a particular embodiment has been described in detail for purposes of illustration, various modifications may be made without departing from the scope and spirit of the invention. Accordingly, the invention is not to be limited, except as by the appended claims.

What is claimed is:

1. A filter housing with a removable filter assembly, comprising:
   an elongated shell assembly having an inlet section, an outlet section, and a filter assembly opening;
   a removable head assembly configured for sealing engagement with the filter assembly opening on the elongated shell assembly;
   a removable filter assembly configured for insertion into and removal from the elongated shell assembly through the filter assembly opening, wherein the filter assembly comprises a plurality of filter cartridges oriented generally between the inlet section and the outlet section;

a ring assembly on an interior perimeter of the shell assembly between the inlet section and the outlet section;

a seal assembly on the filter assembly having surfaces engageable with corresponding ring assembly faces; and a push down assembly disposed around an interior perimeter of the head assembly that applies a force to the removable filter assembly when the head assembly is moved into a closed position so as to press the surfaces of the seal assembly towards the surfaces of the ring assembly and create a seal therebetween;

wherein the plurality of filter cartridges occupy a plurality of through holes in the seal assembly such that the only fluid passage through the seal assembly is through the filter cartridges.

2. The filter housing of claim 1, wherein the push down assembly comprises an annular ring or a plurality of push down lugs disposed around the interior perimeter.

3. The filter housing of claim 1, wherein the filter assembly comprises a top tube sheet configured to receive the push down assembly when the head assembly sealingly engages the filter assembly opening.

4. The filter housing of claim 3, wherein the top tube sheet has beveled surfaces which seat against corresponding beveled surfaces of the push down assembly.

5. The filter housing of claim 1, the seal assembly comprising a bottom tube sheet and a sealing gasket around a perimeter thereof, wherein the bottom tube sheet seats against the ring assembly with the sealing gasket therebetween.

6. The filter housing of claim 5, wherein the sealing gasket comprises a U-shaped gasket around an exterior of the bottom tube sheet, or an O-ring gasket within a groove on the bottom tube sheet.

7. The filter housing of claim 5, wherein the filter assembly comprises two or more baffle sheets oriented generally parallel to the bottom tube sheet and configured such that the plurality of filter cartridges pass through each of the two or more baffle sheets.

8. The filter housing of claim 7, further comprising a plurality of support and lifting rods extending through the baffle sheets of the removable filter assembly.

9. The filter housing of claim 7, wherein the baffle sheets define baffle levels oriented generally transverse to the long axis of the shell assembly, and each of the two or more baffle sheets comprise a cut-out wherein the cut-outs on any two adjacent baffle sheets are staggered or alternated around the interior perimeter of the shell assembly.

10. The filter housing of claim 9, further comprising an impingement surface disposed in the inlet section and fluid openings disposed around edges of the impingement surface, the fluid openings leading into the baffle levels.

11. The filter housing of claim 1, wherein the filter cartridges comprise melt blown polypropylene with a 20 micron rating.

12. The filter housing of claim 1, wherein the seal assembly comprises beveled surfaces which seat into corresponding beveled surfaces of the ring assembly.

13. A filter housing with a removable filter assembly, comprising:

an elongated shell assembly having an inlet section, an outlet section, and a filter assembly opening;

a removable head assembly configured for sealing engagement with the filter assembly opening on the elongated shell assembly;

a removable filter assembly configured for insertion into and removal from the elongated shell assembly through the filter assembly opening, wherein the filter assembly comprises a plurality of filter cartridges oriented generally between the inlet section and the outlet section, and wherein the filter assembly comprises two or more baffle sheets oriented generally perpendicular to the plurality of filter cartridges and configured such that the plurality of filter cartridges pass through each of the two or more baffle sheets;

a ring assembly on an interior perimeter of the shell assembly between the inlet section and the outlet section;

a seal assembly on the filter assembly comprising a bottom tube sheet and a sealing gasket around a perimeter thereof, wherein the bottom tube sheet includes surfaces that seat against engageable surfaces of the ring assembly with a sealing gasket therebetween; and a push down assembly disposed around an interior perimeter of the head assembly that applies a force to the removable filter assembly when the head assembly is moved into a closed position so as to press the surfaces of the seal assembly towards the surfaces of the ring assembly and create a seal therebetween;

wherein the plurality of filter cartridges occupy a plurality of through holes in the bottom tube sheet such that the only fluid passage through the seal assembly is through the filter cartridges.

14. The filter housing of claim 13, wherein the push down assembly comprises an annular ring or a plurality of push down lugs disposed around the interior perimeter.

15. The filter housing of claim 13, wherein the filter assembly comprises a top tube sheet configured to receive the push down assembly when the head assembly sealingly engages the filter assembly opening.

16. The filter housing of claim 15, wherein the top tube sheet has beveled surfaces which seat against corresponding beveled surfaces of the push down assembly.

17. The filter housing of claim 13, wherein the sealing gasket comprises a U-shaped gasket around an exterior of the bottom tube sheet, or an O-ring gasket within a groove on the bottom tube sheet.

18. The filter housing of claim 13, wherein the baffle sheets define baffle levels oriented generally transverse to the long axis of the shell assembly, and each of the two or more baffle sheets comprise a cut-out wherein the cut-outs on any two adjacent baffle sheets are staggered or alternated around the interior perimeter of the shell assembly.

19. The filter housing of claim 18, further comprising an impingement surface disposed in the inlet section and fluid openings disposed around edges of the impingement surface, the fluid openings leading into the baffle levels.

20. The filter housing of claim 13, wherein the filter cartridges comprise melt blown polypropylene with a 20 micron rating.

21. The filter housing of claim 13, wherein the bottom tube sheet of the seal assembly comprises beveled surfaces which seat into corresponding beveled surfaces of the ring assembly.

22. The filter housing of claim 13, further comprising a plurality of support and lifting rods extending through the baffle sheets of the removable filter assembly.

* * * * *